United States Patent [19]  
Smith et al.

[11] 4,080,318  
[45] Mar. 21, 1978

[54] POLYCAPROLACTONE URETHANE DERIVATIVES AND COATING COMPOSITIONS THEREOF

[75] Inventors: Oliver Wendell Smith, South Charleston; Joseph Victor Koleske, Charleston, both of W. Va.

[73] Assignee: Union Carbide Corporation, New York, N.Y.

[21] Appl. No.: 690,278

[22] Filed: May 26, 1976

[51] Int. Cl.$^2$ .................... C08G 18/64; C08G 18/22; C08L 75/04; C08L 61/32

[52] U.S. Cl. .................... 260/77.5 AN; 260/29.2 TN; 260/29.4 R; 260/77.5 AM; 260/849; 260/858; 260/859 R

[58] Field of Search ............... 260/77.5 AN, 29.2 TN, 260/2.5 AN, 858, 859, 849, 77.5 R, 77.5 AM

[56] References Cited

U.S. PATENT DOCUMENTS

| | | | |
|---|---|---|---|
| 3,186,971 | 6/1965 | Hostettler et al. | 260/77.5 AN |
| 3,298,974 | 1/1967 | Bernstein et al. | 260/2.5 AN |
| 3,431,223 | 3/1969 | Reymore et al. | 260/2.5 AN |
| 3,449,467 | 6/1969 | Wynstra | 260/77.5 AN |
| 3,459,733 | 8/1969 | Byrd et al. | 260/2.5 AN |
| 3,639,315 | 2/1972 | Rodriquez | 260/29.2 TN |
| 3,775,354 | 11/1973 | Hostettler et al. | 260/2.5 AN |

Primary Examiner—H.S. Cockeram  
Attorney, Agent, or Firm—Francis M. Fazio

[57] ABSTRACT

Water insoluble urethane adducts are produced comprising the reaction product of a polycaprolactone polyol, a polyisocyanate and an anhydride of a polycarboxylic acid. The polycaprolactone polyol reacted with the polyisocyanate and the anhydride of the polycarboxylic acid has an average of at least two hydroxyl groups in the molecule, a hydroxyl number of from about 15 to about 600 and an average molecular weight of from about 290 to about 6,000. The carboxylic acid anhydride has at least one intramolecular carboxylic anhydride group. These water insoluble urethane adducts on reaction with an inorganic or organic base produce water soluble, carboxyl modified urethane oligomer addition reaction products which are eminently suitable for the production of aqueous coatings compositions. Exceptionally good coatings compositions are obtained when a crosslinker is present in the coating composition.

71 Claims, No Drawings

POLYCAPROLACTONE URETHANE DERIVATIVES AND COATING COMPOSITIONS THEREOF

BACKGROUND OF THE INVENTION

Governmental regulations have placed ever increasing restrictions on the amounts and type of organic volatiles permitted to escape into the atmosphere from coatings compositions. Considerable efforts have been expended to develop coatings compositions having a minimal amount of volatile organic components and this had led to development of powder coatings, radiation curable coating and water borne coatings. In these recent developments the amounts of organic solvents present are minimal and consequently there is little or no atmospheric pollution.

A particularly well known resin used in the coatings industry is the class of resins derived from epsilon-caprolactone. These polycaprolactone polyol derivatives produce coating materials of exceptional and desirable properties. However, as in all major instances in the past, they have generally been applied from organic solvent solutions. Any discovery which would eliminate the organic solvent would be of great importance in the coatings industry which depends upon these materials in many manufacturing or coating operations. Consequently, any discovery, such as the one which is hereinafter described, which would serve to lower atmospheric pollution and still produce a good satisfactory coating composition would be of great importance.

SUMMARY OF THE INVENTION

It has now been found that water soluble polycaprolactone urethane derivatives can be prepared that can be used for the production of water borne coatings compositions. These water soluble polycaprolactone urethane derivatives are obtained by reacting a polycaprolactone polyol, a polyisocyanate and an anhydride of a polycarboxylic acid to produce a carboxyl modified urethane adduct which is generally water insoluble. This urethane adduct is converted to the water soluble form by reaction with an inorganic or organic base. The water soluble carboxyl modified urethane oligomer addition reaction products resulting are then formulated into coatings compositions. The preferred coatings compositions are those that additionally contain a crosslinker. The aqueous coatings compositions are applied in conventional manner and thermally cured to dry film coatings.

DESCRIPTION OF THE INVENTION

The carboxyl modified urethane adducts or derivatives that are eventually used to produce the coatings compositions are the adducts comprising the reaction product of a polycaprolactone polyol, a polyisocyanate and an anhydride of a polycarboxylic acid which mixture of reaction products has subsequently been converted to a water soluble form by reaction with a base. As starting materials for producing the adducts one can use any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The polyols for use herein can be single compounds or mixtures of compounds and either can be used in this invention. The method for producing the polycaprolactone polyols is of no consequence and the organic functinal initiators can be any polyhydroxyl compound as is shown in U.S. Pat. No. 3,169,945. Illustrative there are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxy-propylene) glycols, and similar polyalkylene glycols, either blocked, capped or heteric, containing up to about 40 or more alkyleneoxy units in the molecule, 3 methyl-1-5-pentanediol cyclohexanediol, 4,4'-methylene-bis-cyclohexanol, 4,4'-ispropylidene bis-cyclohexanol, xylenediol, 2-(4-hydroxymethylphenyl) ethanol, 1,4-butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

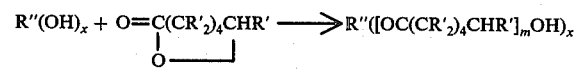

In this equation the organic functional initiator is the R"—(OH)$_x$ compound and the caprolactone is the

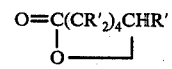

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The most preferred are the polycaprolactone diol compounds having an average molecular weight of from about 290 to about 500 and the polycaprolactone triol compounds having an average molecular weight of from about 300 to about 1,000; these are preferred because of their low viscosity properties. In the formula m is an integer representing the average number of repeating units needed to produce the compound having said molecular weights. The average hydroxyl number of the polycaprolactone polyol can be from about 15 to 600, preferably from 200 to 500; and the polycaprolactone polyol can have an average of from 2 to 6, preferably 2 to 4, hydroxyl groups.

Illustrative of polycaprolactone polyols that can be used as starting materials in this invention one can mention the reaction products of a polyhydroxyl compound having an average of from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

| Initiator | Average MW of polyol | Average No. of CPL units in molecules |
|---|---|---|
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalence glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 2,000 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,398 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 835 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4. |
| 28 1,2,6-Hexanetriol | 476 | 3 |
| 29 Trimethylolpropane | 590 | 4 |
| 30 Trimethylolpropane | 750 | 5.4 |
| 31 Trimethylolpropane | 1,103 | 8.5 |
| 32 Triethanolamin- | 890 | 6.5 |
| 33 Erythritol | 920 | 7 |
| 34 Pentaerythritol | 1,219 | 9.5 |

*Average molecular weight of glycol.

The structure of the compounds in the above tabulation are obvious to one skilled in the art based on the information given. The structure of compound No. 7 is:

wherein the variable $r$ is an integer, the sum of $r + r$ has an average value of 3.7 and the average molecular weight is 527. The structure of compound No. 20 is:

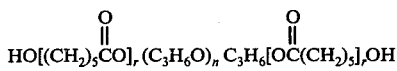

wherein the sum of $r + r$ has an average value of 6 and the average molecular weight is 1,684. This explanation makes explicit the structural formulas of compounds 1 to 34 set forth above.

The polyisocyanates that can be used in this invention are well known to those skilled in the art and should not require detailed description herein. Any of the polyisocyanates can be used alone or in admixture with other isocyanates including the monoisocyanates. Illustrative thereof one can mention methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, the o-, m-, and p-chlorophenyl isocyanates, benzyl isocyanate, naphthyl isocyanate, o-ethylphenyl isocyanate, the dichlorophenyl isocyanates, methyl isocyanate, butyl isocyanate, n-propyl isocyanate, octadecyl isocyanate, 3,5,5-trimethyl-1-isocyanate-3-isocyanatomethylcyclohexane, di(2-isocyanatoethyl)-bicyclo(2.2.1)-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanate, tetramethylene diisocyanate, dicyclohexyl-4,4'-methane diisocyanate, cyclohexane-1,4-diisocyanate, 1,5-haphthylene diisocyanate, 4,4'-diisocyanate diphenyl ether, 2,4,6-triisocyanate toluene, 4,4',4"-triisocyanate triphenyl methane, diphenylene-4,4-diisocyanate, the polymethylene polyphenylisocyanates, as well as any of the other organic isocyanates known to the average skilled chemist.

The amount of isocyanate used can be an amount sufficient to permit reaction of the isocyanato group with up to about 0.9 equivalent of the total number of hydroxyl equivalents present. Thus, from 0.025 to 0.9 isocyanato equivalent is reacted per hydroxyl equivalent, preferably from 0.04 to 0.5 isocyanato equivalent per hydroxyl equivalent, and most preferably from 0.04 to 0.25 isocyanato equivalent per hydroxyl equivalent initially charged.

Illustrative of the polycarboxylic acid anhydrides that can be used one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the polycaprolactone polyol can be an amount sufficient to react with all the residual unreacted hydroxyl groups; however, it is preferred to use an amount which is insufficient to react with all of the residual hydroxyl groups present in the polycaprolactone polyol after its reaction with the isocyanate. This amount will vary and can be from 0.1 to 1 anhydride equivalent for each unreacted hydroxyl equivalent or group present in the polycaprolactone derivative in the reaction mixture. It is preferably from 0.1 to 0.4 and, in a most preferred instance, one anhydride equivalent or anhydride moiety is charged for each nine unreacted hydroxyl equivalents or groups present in the reaction mixture.

The reaction temperature when the isocyanate derivative is initially reacted with the polycaprolactone polyol can be from about room temperature to about 75° C. The temperature is then raised when this urethane derivative is subsequently reacted with the polycarboxylic acid anhydride and this temperature is the same as that which is used when all three components are initially charged together. The reaction of any mixture with the anhydride is carried out at a temperature of from about 75° to 200° C., preferably from about 100° to 140° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 150° C. is adequate to produce the initial water insoluble carboxyl modified urethane oligomer addition reaction product obtained by the reaction of these intermediates.

The water insoluble urethane adduct formed at this stage of the reaction is a viscous liquid in most instances. However, in some instances the product may solidify upon standing for an extended period of time. This, however, does not detract from its further utility. Generally these carboxyl modified urethane oligomers or adducts are water insoluble but solvent soluble.

The water insoluble urethane adducts described above are converted to water soluble form by reaction with a base which can be either an inorganic or an organic base. The preferred bases are the organic amines. The bases that can be used are well known to those skilled in the art and any of the known bases can be used. Illustrative thereof one can mention ammonia, butylamine, morpholine, piperazine, triethylamine, N-methyl diethanolamine, N,N-diethyl ethanolamine, N,N-dimethyl propanolamine, triethanolamine, diethylamine, triisopropanolamine, monoethanolamine, diethanolamine, mono-isopropylamine, diisopropanolamine, 2-amino-2-methyl-1-propanolamine, and the like. While any amine can be used, the preferred are the tertiary amines.

The amount of amine or base added is an amount sufficient to neutralize essentially all of the free carboxylic groups in the water insoluble adduct and to take the pH of the reaction mixture to about 6 to 10, preferably from 7 to 9.

Reaction with the amine produces a urethane product or adduct which is predominantly water soluble. This water soluble adduct is eminently suitable for the production of a water borne coating composition. While applicants have not fully established the structures of the adducts present in their reaction product mixture, it has been theorized that the reaction can proceed along the following route; however, the reaction product is a complex mixture of components.

Step 1

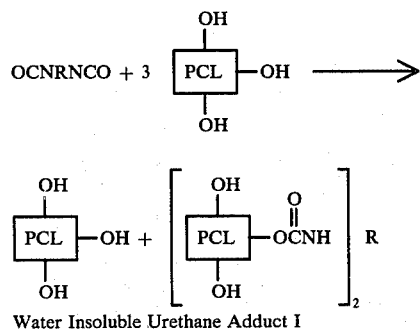

Water Insoluble Urethane Adduct I

Step 2

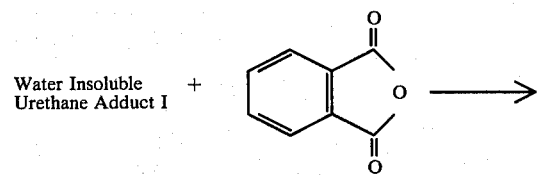

-continued

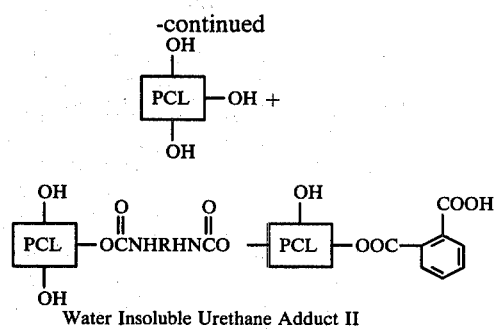

Water Insoluble Urethane Adduct II

Step 3

Water Insoluble Urethane Adduct II + R'$_3$N ⟶

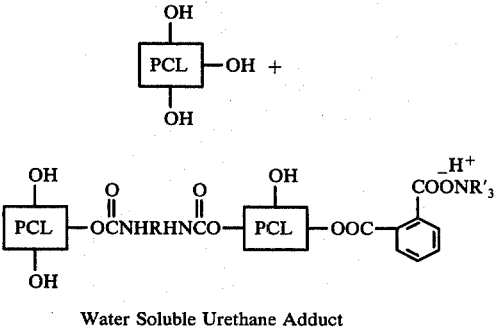

Water Soluble Urethane Adduct

In the above, the unit

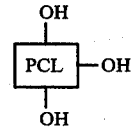

represents a polycaprolactone triol; OCNRNCO represents a diisocyanate and R'$_3$N represents a tertiary amine. In some instances, depending upon the amount of anhydride used in Step 2, the amount of water used to dissolve the adduct of Step 3 may be restricted before evidence of insolubilization is noted. While this theoretical explanation is presented, applicants do not intend to be bound by any theory.

In a typical embodiment one can react the polycaprolactone polyol and the polyisocyanate at a temperature up to about 75° C and then added the carboxylic acid anhydride and react at 75° C to 200° C to produce the water insoluble urethane adduct. This is then reacted or neutralized with a base or amine at any convenient temperature and there is obtained the water soluble polycaprolactone urethane adduct. In a second embodiment all of the reactants are initially charged together and the reaction is heated and completed at a temperature of from 75° C to 200° C.

It is customary to use any of the known urethane-forming reaction catalysts during the isocyanate reaction with the polyol. These are well known and any of the catalysts can be used. Illustrative thereof are dibutyltin dilaurate, stannous octoate, triethylenediamine, triethylamine, the known tin salt catalysts, and the like.

In the schematics shown above specific ratios and compounds were employed for illustrative purposes only. It is apparent, in view of our complete description, that these can be modified within the ranges disclosed in this application.

The water soluble polycaprolactone urethane derivatives or adducts prepared above can be used to produce coating compositions. They can also be modified in known manner by the addition of pigments, fillers and other additives conventionally added to coating compositions. In any instance they are applied to a surface by conventional means and then thermally cured either alone or in the presence of a crosslinker. It is preferred, however, to have a crosslinker present and in the such instances the known catalyst for expediting the crosslinking reaction are generally added. The particular pigment or colorants added to the coating compositions are immaterial and any of the known conventional ones can be used. The amount of crosslinker present in the coating composition can vary from 25 to 200 weight percent, preferably 50 to 100 weight percent, based on the weight of the water soluble urethane adduct present. Among the suitable crosslinkers are the urea formaldehyde aminoplasts, the hexamethoxymethyl melamines, and the known water dispersible transethers thereof with lower alkanols, benzoguanamine, acrylamide resins, as well as any of the other well known crosslinkers of the amine type.

Catalysts are generally present to catalyze a melamine or amine cure system and these are also well known. Among the common catalysts are the mineral acids such as hydrochloric acid or sulphuric acid, paratoluene sulphonic acid, dodecylbenzene sulphonic acid, phosphoric acid, maleic acid, trimelletic acid, phthalic acid, succinic acid, and the like. Also useful are the half esters of said acids. It is known that the stronger the acidity, the better the catalytic activity.

The coating compositions are applied to a substrate by the known conventional methods. They are cured by heating at a temperature of about 125° to 250° C, preferably from 150° to 200° C. for a period of time sufficient to obtain a dry film. Generally, this time will range from about one to 30 minutes, preferably from 10 to 20 minutes. The components present in a particular composition used will determine the temperature and time that will be required to obtain an adequate cure and a good film coating.

The coatings compositions of this invention are generally high solids coatings compositions and they can contain as much as about 80 weight percent solids therein. Generally the total solids content of the coatings compositions of this invention range from about 30 to 70 weight percent of the total weight of the composition.

The coatings compositions were evaluated according to the following procedures. Crosshatch adhesion refers to a test using 10 parallel single edge razor blades to scribe test films with 2 sets of perpendicular lines on a crosshatch pattern. Ratings are based on the amount of film removed after applying and subsequently pulling a contact adhesive tape (Scotch Brand 606) away from the surface of the scribed coating at a 90° angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate.

Solvent resistance is a measure of the resistance of the cured film to attack by acetone and is reported in the number of rubs or cycles of acetone soaked cheesecloth required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is recorded as the films reverse-impact resistance.

In this application the following definitions describe the particular compounds that are used in the example: Silicone Surfactant I is

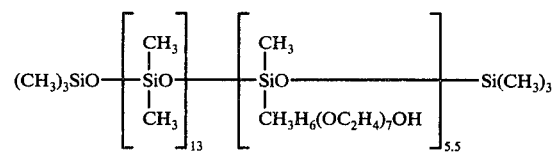

Polyol A is a polycaprolactone diol having an average molecular weight of 530 and an average hydroxyl number, measured in milligrams of potassium hydroxide per gram, of 212.

Polyol B is a polycaprolactone triol having an average molecular weight of 540 and an average hydroxyl number of 310.

Polyol C is a polycaprolactone triol having an average molecular weight of 300 and an average hydroxyl number of 560.

Polyisocyanate A is 4,4'-methylenebis (cyclohexyl isocyanate). Polyisocyanate B is the biuret of hexamethylene diisocyanate having an equivalent weight of about 190; 75 weight percent solution in 1/1 xylene/methoxyethyl acetate. Polyisocyanate C is poly(diphenylmethane diisocyanate) having an equivalent weight of about 45.

The following examples further serve to define the invention.

EXAMPLE 1

A mixture of 328 grams of Polyol C and 0.08 gram of dibutyltin dilaurate was charged to a 500 ml. reaction flask that was equipped with a stirrer, thermometer, dropping funnel and purge tube and heated to 45° C. There was slowly added over a period of 30 minutes 72 grams of Polyisocyanate A. During the addition an exotherm of about 20° C. was observed. At the end of the addition, analysis indicated only a slight trace of free isocyanato group. Then 30.1 grams of maleic anhydride were added and the temperature was increased to 130° C. After 5 minutes reaction at 130° C. heating was discontinued and the product was permitted to cool to room temperature. The viscous liquid reaction product was water insoluble, had an RVT Brookfield viscosity of 184,000 cps. at 25° C. and an acid number of 40 mg. of KOH/gram.

EXAMPLES 2 to 4

The water insoluble reaction product oligomer of Example 1 was used to produce water soluble coating compositions by neutralization with dimethyl ethanolamine and then formulated as described below. The compositions were prepared by adding the reactants to a reactor and stirring at room temperature until a uniform mixture resulted. The water soluble compositions were then coated on steel panels and cured at 350° F. for 20 minutes. Commercially acceptable solid dry films resulted in each case. Crosshatch adhesion of all coatings was 100 percent. The solvent resistance was also satisfactory with all of the samples showing resistance to acetone double rubs in excess of 100, in addition, all of the dried coatings passed the ⅛ inch mandrel flexibility test.

| Example | 2 | 3 | 4 |
|---|---|---|---|
| Oligomer, g.* | 10 | 10 | 10 |
| Hexamethoxymethyl melamine, g. | 7.5 | 10 | 12.5 |
| Dimethyl ethanol-amine, g. | .8 | .8 | .8 |
| Silicone Surfactant I, g. | 0.04 | 0.04 | 0.04 |
| Water | 6.7 | 6.7 | 6.7 |
| Reverse impact, in/lb. | 25 | 75 | 320 |
| Pencil hardness | 3H | 3H | 2H |

*Oligomer = The reaction product of Example 1

The results indicate that increasing the concentration of the hexamethoxymethyl melamine causes an improvement in the reverse impact properties of the coating composition.

EXAMPLE 5

In a manner similar to that described in Example 1, 352 grams of Polyol C were initially reacted with 48 grams of the Polyisocyanate A and then reacted with 30.1 grams of maleic anhydride. There was produced a water insoluble reaction product having a Brookfield viscosity of 46,200 cps. at 25° C. and an acid number of 38.

EXAMPLES 6 to 8

In these examples the water insoluble reaction product of Example 5 was used to produce water soluble coating compositions as described in Examples 2 to 4. These water soluble coating compositions were then applied to steel panels and cured at 350° F. for 20 minutes to produce satisfactory dry film all of which showed 100 percent crosshatch adhesion and more than 100 acetone double rubs. The coating composition of Example 6 showed a failure in the ⅛ inch mandrel flexibility test and those of Examples 7 and 8 passed this test.

| Example | 6 | 7 | 8 |
|---|---|---|---|
| Oligomer, g.* | 10 | 10 | 10 |
| Hexamethoxymethyl melamine, g. | 7.5 | 10 | 12.5 |
| Dimethyl ethanol-amine, g. | 0.8 | 0.8 | 0.8 |
| Silicone Surfactant I, g. | 0.04 | 0.04 | 0.04 |
| Water, g. | 6.7 | 6.7 | 6.7 |
| Reverse impact, in./lb. | 15 | 25 | 200 |
| Pencil hardness | 4H | 3H | 3H |

*Oligomer = The reaction product of Example 5

The results showed increase in reverse impact properties or flexibility as the amount of the crosslinker is increased. The addition of the dimethyl ethanolamine enables the production of a water soluble coating composition.

EXAMPLE 9

In a manner similar to that described in Example 1, 376 grams of Polyol C were initially reacted with 24 grams of Polyisocyanate A and then reacted with 30.1 grams of maleic anhydride. The water insoluble oligomer reaction product had a Brookfield viscosity of 11,120 cps. at 25° C. and an acid number of 39.4.

EXAMPLES 10 to 12

Water soluble coating compositions were produced in the manner described in Examples 2 to 4 and applied to steel panels with a No. 60 wire wound rod. The applied coatings were cured at 350° F. for 20 minutes to yield dry films. It was observed that all coatings had a pencil hardness of 2H, crosshatch adhesion of 100 percent and more than 100 acetone double rubs. However, the coating composition of Example 10 had a reverse impact of less than 5 in/lb. and failed the ⅛ inch mandrel flexibility test. The coating composition of Example 11 had a reverse impact of 25 and also failed the mandrel flexibility test. While the coating composition of Example 12 passed the mandrel flexibility test, it had a reverse impact of only 25. The results showed that the amount of urethane linkages present in the reaction product has an effect on the properties of the final coating.

| Example | 10 | 11 | 12 |
|---|---|---|---|
| Oligomer, g.* | 10 | 10 | 10 |
| Hexamethoxymethyl melamine, g. | 7.5 | 10 | 12.5 |
| Dimethyl ethanol-amine, g. | 0.8 | 0.8 | 0.8 |
| Silicone surfactant I, g. | 0.04 | 0.04 | 0.04 |
| Water, g. | 6.7 | 6.7 | 6.7 |

*Oligomer = The reaction product of Example 9

EXAMPLE 13

A reactor equipped as described in Example 1 was charged with 331.2 grams of Polyol B, 36.8 grams of Polyol A, 0.08 gram of dibutyltin dilaurate, 32 grams of an 80/20 mixture of 2,4- and 2,6- tolylene diisocyanate, and 47 grams of phthalic anhydride. The mixture was stirred at 130° C. for 30 minutes and a water insoluble oligomer was produced. It was cooled to 45° C and 26 grams of morpholine were added. This oligomer reaction product was cooled to room temperature and set aside. It had a Brookfield viscosity of 108,600 cps. at 25° C., an acid number of 41 and it was water soluble.

EXAMPLE 14

A pigmented water soluble coating composition was produced containing 165 grams of the water soluble reaction product of Example 13, 150 grams of titanium dioxide, 135 grams of hexamethoxymethyl melamine, containing approximately 5 weight percent methylol groups, 1.3 grams of Silicone Surfactant I, 1 gram of adduct of 10.5 moles of ethylene oxide with nonyl phenol, 0.1 gram of a 50/50 mixture of maleic acid/-dimethyl ethanolamine as catalyst and 35 grams of water. This coating composition was sprayed on to steel panels and cured at 350° F. for 20 minutes. The dry cured coating had a reverse impact of 175 in/lb., pencil hardness of F, crosshatch adhesion of 100 percent, ⅛ inch mandrel flexibility of 100 percent and a solvent resistance of more than 100 acetone double rubs.

EXAMPLE 15

A reaction flask was charged with 990 grams of Polyol C, 990 grams of Polyol B, 180 grams of Polyisocyanate A, and 180 grams of maleic anhydride. The mixture was stirred at 130° C. for 30 minutes to produce a water insoluble product. It was then cooled to 60° C and 151 grams of N,N-dimethyl ethanolamine and 99 grams of 2-butoxy ethanol were added and a water soluble oligomer resulted. This reaction product mixture had a Brookfield viscosity of 22,000 cps. and an acid number of 40.

The water soluble coating composition was prepared by rolling overnight on a ball mill a mixture of 220 grams of the above water soluble reaction product mixture, 200 grams of titanium dioxide and 180 grams of hexamethoxymethyl melamine having about 5 weight percent methylol groups. Sixty grams of this pigmented solution were diluted with 13.3 grams of water and 0.1 gram of Silicone Surfactant I to produce a water soluble coating composition that was applied to steel panels with a No. 60 wire wound rod and cured at 350° F. for 20 minutes. The dry cured coating was smooth, passed 100 acetone double rubs, adherent to the substrate and had a reverse impact resistance of 75 in.-lb.

EXAMPLE 16

A reaction flask was charged with 180 grams of Polyol A and 0.05 grams of dibutyltin dilaurate and heated to 50° C. Over a 30 minute period 20 grams of Polyisocyanate B were added in a dropwise manner and the mixture was stirred for 30 minutes at 50° to 55° C. Then 28.6 grams of phthalic anhydride were added, the temperature was raised to 130° C. and stirred thereat for 30 minutes and the water insoluble adduct was obtained. The mixture was cooled and neutralized with 17.3 grams of N,N-dimethyl ethanolamine to obtain a water soluble oligomer reaction product mixture.

EXAMPLE 17

Following the procedure described in Example 16 300 grams of Polyol C containing 0.35 gram of dibutyltin dilaurate was reacted with 30 grams of Polyisocyanate C. This reaction product was then reacted with 58 grams of phthalic anhydride in the same manner. The resultant water insoluble reaction product was treated with 32.6 grams of N,N-dimethyl ethanolamine and converted to a water soluble material having a Brookfield viscosity of 1,276 poises at 25° C. A 10 gram portion of this reaction product mixture was formulated with 10 grams of hexamethoxymethyl melamine having about 1.5 weight percent methylol groups, 0.04 gram of Silicone Surfactant I and 4 grams of water to produce a clear water soluble coating composition. The coating composition was coated on steel panels with a No. 60 wire wound rod and cured at 350° F. for 20 minutes to produce hard adherent films that were acetone resistant.

EXAMPLE 18

In a procedure similar to that described in Example 17, 300 grams of Polyol C containing 0.35 grams of dibutyltin dilaurate was reacted with 30 grams of hydrogenated tolylene diisocyanate. This was then reacted with 58 grams of phthalic anhydride at 130° C. for 30 minutes. The resultant water insoluble product was cooled to 60° C. and 32.6 grams of N,N-dimethyl ethanolamine were added to yield a water soluble composition having a Brookfield viscosity of 1,050 poises at 25° C. A 10 gram portion of this reaction product mixture was formulated with 10 grams of hexamethoxymethyl melamine having a 1.5 weight percent methylol group content, 0.04 gram of Silicone Surfactant I, and 4 grams of distilled water to produce a clear water soluble coating composition. This was coated on steel panels with a No. 60 wire wound rod and cured at 350° F. for 20 minutes to yield a hard adherent coating that was resistant to acetone.

EXAMPLE 19

A master batch of a water soluble coating composition was produced as described in Example 18 and portions thereof were formulated with various water soluble diluents to determine the effect of the diluent on the coating. In all instances the coatings were applied to steel panels and cured at 350° F. for 20 minutes to yield films having good crosshatch adhesion and excellent acetone resistant properties. The formulations and results are tabulated below:

| Run | A | B | C |
| --- | --- | --- | --- |
| Oligomer, g.* | 20.04 | 20.04 | 20.04 |
| Trimethylol propane, g. | 3 | 0 | 0 |
| Tetraethylene glycol, g. | 0 | 3 | 0 |
| Diluent X, g. | 0 | 0 | 3 |
| Pencil hardness | 3H | 3H | F |
| Reverse impact, in/lb. | <5 | 25 | 125 |

*Oligomer = Formulation described at the beginning of this Example.
Diluent X = Adduct of 10.5 moles of ethylene oxide with nonyl phenol.

What we claim is:

1. A water insoluble polycaprolactone urethane adduct comprising the reaction product of a polycaprolactone polyol, an organic polyisocyanate and an anhydride of a polycarboxylic acid, wherein said polycaprolactone polyol has at least two hydroxyl groups in the molecule, a hydroxyl number of from 15 to 600 and an average molecular weight of from 290 to about 6,000, and wherein said anhydride has at least one intramolecular carboxylic anhydride group, and wherein from 0.025 to 0.9 isocyanato equivalent per initial hydroxyl equivalent and from 0.1 to 1 carboxylic anhydride equivalent for each unreacted hydroxyl equivalent are reacted.

2. A water insoluble polycaprolactone urethane as claimed in claim 1, wherein said polycaprolactone polyol has from 2 to 6 hydroxyl groups.

3. A water insoluble polycaprolactone urethane as claimed in claim 1, wherein said polycaprolactone polyol has from 2 to 4 hydroxyl groups.

4. A water insoluble polycaprolactone urethane as claimed in claim 1, wherein said polycaprolactone polyol has an average molecular weight of from 290 to about 3,000.

5. A water insoluble polycaprolactone urethane as claimed in claim 1, wherein said polycaprolactone polyol is a diol having an average molecular weight of from 290 to about 500.

6. A water insoluble polycaprolactone urethane as claimed in claim 1, wherein said polycaprolactone polyol is a triol having an average molecular weight of from about 300 to about 1,000.

7. A water insoluble polycaprolactone urethane as claimed in claim 1, wherein said polycaprolactone polyol is a mixture of polycaprolactone polyols.

8. A water insoluble adduct as claimed in claim 1, wherein said anhydride is maleic anhydride.

9. A water insoluble adduct as claimed in claim 1, wherein said anhydride is phthalic anhydride.

10. A water insoluble adduct as claimed in claim 1, wherein said polyisocyanate is tolylene diisocyanate.

11. A water insoluble adduct as claimed in claim 1, wherein said polyisocyanate is 4,4'-methylene-bis(cyclohexyl isocyanate).

12. A water insoluble adduct as claimed in claim 1, wherein said polyisocyanate is poly(diphenylmethane diisocyanate).

13. A water insoluble adduct as claimed in claim 1, wherein said polyisocyanate is the biuret of hexamethylene diisocyanate.

14. A water insoluble polycaprolactone urethane adduct as claimed in claim 1, wherein from 0.04 to 0.5 isocyanato equivalent per initial hydroxyl equivalent is reacted.

15. A water insoluble polycaprolactone urethane adduct as claimed in claim 1, wherein from 0.04 to 0.25 isocyanato equivalent per initial hydroxyl equivalent is reacted.

16. A water insoluble polycaprolactone urethane adduct as claimed in claim 1, wherein from 0.04 to 0.5 isocyanato equivalent per initial hydroxyl equivalent and from 0.1 to 0.4 carboxylic anhydride equivalent for each unreacted hydroxyl equivalent are reacted.

17. A water insoluble polycaprolactone urethane adduct as claimed in claim 1, wherein from 0.04 to 0.25 isocyanato equivalent per initial hydroxyl equivalent and from 0.1 to 0.4 carboxylic anhydride equivalent for each unreacted hydroxyl equivalent are reacted.

18. A water insoluble polycaprolactone urethane adduct as claimed in claim 1, wherein said polycaprolactone polyol is a polycaprolactone triol having an average molecular weight of 300 and an average hydroxyl number of 560, said polyisocyanate is 4,4'-methylene bis(cyclohexyl isocyanate) and said anhydride is maleic anhydride.

19. A water insoluble polycaprolactone urethane adduct as claimed in claim 1, wherein said polycaprolactone polyol is a mixture of a polycaprolactone diol having an average molecular weight of 530 and an average hydroxyl number of 212 and a polycaprolactone triol having an average molecular weight of 300 and an average hydroxyl number of 560, said polyisocyanate is tolylene diisocyanate and said anhydride is phthalic anhydride.

20. A water insoluble polycaprolactone urethane adduct as claimed in claim 1, wherein said polycaprolactone polyol is a mixture of a polycaprolactone triol having an average molecular weight of 540 and an average hydroxyl number of 310 and a polycaprolactone triol having an average molecular weight of 300 and an average hydroxyl number of 560, said polyisocyanate is 4,4'-methylene bis(cyclohexyl isocyanate) and said anhydride is maleic anhydride.

21. A water insoluble polycaprolactone urethane adduct as claimed in claim 1, wherein said polycaprolactone polyol is a polycaprolactone triol having an average molecular weight of 540 and an average hydroxyl number of 310, said polyisocyanate is poly(diphenylmethane diisocyanate) and said anhydride is phthalic anhydride.

22. A water insoluble polycaprolactone urethane adduct as claimed in claim 1, wherein said polycaprolactone polyol is a polycaprolactone triol having an average molecular weight of about 300 and an average hydroxyl number of 560, said polyisocyanate is poly(diphenylmethane diisocyanate) and said anhydride is phthalic anhydride.

23. A water insoluble polycaprolactone urethane adduct as claimed in claim 1, wherein said polycaprolactone polyol is a polycaprolactone triol having an average molecular weight of about 300 and an average hydroxyl number of 560, said polyisocyanate is hydrogenated tolylene diisocyanate and said anhydride is phthalic anhydride.

24. A water soluble polycaprolactone urethane adduct comprising the adduct reaction product of a polycaprolactone polyol, an organic polyisocyanate and an anhydride of a polycarboxylic acid, wherein said polycaprolactone polyol has at least two hydroxyl groups in the molecule, a hydroxyl number of from 15 to 600 and an average molecular weight of from 290 to about 6,000, and wherein said anhydride has at least one intramolecular carboxylic anhydride group and an inorganic or organic base in an amount sufficient to neutralize the free carboxyl groups of said adduct reaction product, and wherein in said adduct reaction product from 0.025 to 0.9 isocyanato equivalent per initial hydroxyl equivalent and from 0.1 to 1 carboxylic anhydride equivalent for each unreacted hydroxyl equivalent are reacted.

25. A water soluble polycaprolactone urethane adduct as claimed in claim 24, wherein said polycaprolactone polyol has from 2 to 6 hydroxyl groups, and said base is an organic base.

26. A water soluble polycaprolactone urethane adduct as claimed in claim 24, wherein said polycaprolactone polyol has from 2 to 4 hydroxyl groups, and said base is an organic base.

27. A water soluble polycaprolactone urethane adduct as claimed in claim 24, wherein said polycaprolactone polyol has an average molecular weight of from 290 to about 3,000, and said base is an organic base.

28. A water soluble polycaprolactone urethane adduct as claimed in claim 24, wherein said polycaprolactone polyol is a diol having an average molecular weight of from 290 to about 500, and said base is an organic base.

29. A water soluble polycaprolactone urethane adduct as claimed in claim 24, wherein said polycaprolactone polyol is a triol having an average molecular weight of from about 300 to about 1,000, and said base is an organic base.

30. A water soluble polycaprolactone urethane adduct as claimed in claim 24, wherein said polycaprolactone polyol is a mixture of polycaprolactone polyols, and said base is an organic base.

31. A water soluble polycaprolactone urethane adduct as claimed in claim 24, wherein said anhydride is maleic anhydride, and said base is an organic base.

32. A water soluble polycaprolactone urethane adduct as claimed in claim 24, wherein said anhydride is phthalic anhydride, and said base is an organic base.

33. A water soluble polycaprolactone urethane adduct as claimed in claim 24, wherein said polyisocyanate is tolylene diisocyanate, and said base is an organic base.

34. A water soluble polycaprolactone urethane adduct as claimed in claim 24, wherein said polyisocyanate is 4,4'-methylene-bis(cyclohexyl isocyanate) and said base is an organic base.

35. A water soluble polycaprolactone urethane adduct as claimed in claim 24, wherein said polyisocyanate is poly(diphenylmethane diisocyanate), and said base is an organic base.

36. A water soluble polycaprolactone urethane adduct as claimed in claim 24, wherein said polyisocyanate is the biuret of hexamethylene diisocyanate, and said base is an organic base.

37. A water soluble polycaprolactone urethane adduct as claimed in claim 24, wherein in said adduct reaction product from 0.04 to 0.5 isocyanato equivalent per initial hydroxyl equivalent is reacted, and said base is an organic base.

38. A water soluble polycaprolactone urethane adduct as claimed in claim 24, wherein in said adduct reaction product from 0.04 to 0.25 isocyanato equivalent per initial hydroxy equivalent is reacted, and said base is an organic base.

39. A water soluble polycaprolactone urethane adduct as claimed in claim 24, wherein in said adduct reaction product from 0.025 to 0.9 isocyanato equivalent per initial hydroxyl equivalent and from 0.1 to 1 carboxylic anhydride equivalent for each unreacted hydroxyl equivalent are reacted, and said base is an organic base.

40. A water soluble polycaprolactone urethane adduct is claimed in claim 24, wherein in said adduct reaction product from 0.04 to 0.5 isocyanato equivalent per initial hydroxy equivalent and from 0.1 to 0.4 carboxylic anhydride equivalent for each unreacted hydroxyl equivalent are reacted, and said base is an organic base.

41. A water soluble polycaprolactone urethane adduct as claimed in claim 24, wherein in said adduct reaction product from 0.04 to 0.25 isocyanato equivalent per initial hydroxyl equivalent and from 0.1 to 0.4 carboxylic anhydride equivalent for each unreacted hydroxyl equivalent are reacted, and said base is an organic base.

42. A water soluble polycaprolactone urethane adduct as claimed in claim 24, wherein in said adduct reaction product said polycaprolactone polyol is a polycaprolactone triol having an average molecular weight of 300 and an average hydroxyl number of 560, said polyisocyanate is 4,4'-methylene bis(cyclohexyl isocyanate) and said anhydride is maleic anhydride, and said base is N,N-dimethyl ethanolamine.

43. A water soluble polycaprolactone urethane adduct as claimed in claim 24, wherein in said adduct reaction product said polycaprolactone polyol is a mixture of a polycaprolactone diol having an average molecular weight of 530 and an average hydroxyl number of 212 and a polycaprolactone triol having an average molecular weight of 300 and an average hydroxyl number of 560, said polyisocyanate is tolylene diisocyanate and said anhydride is phthalic anhydride, and said base is morpholine.

44. A water soluble polycaprolactone urethane adduct as claimed in claim 24, wherein in said adduct reaction product said polycaprolactone polyol is a mixture of a polycaprolactone triol having an average molecular weight of 540 and an average hydroxyl number of 310 and a polycaprolactone triol having an average molecular weight of 300 and an average hydroxyl number of 560, said polyisocyanate is 4,4'-methylene bis(cyclohexyl isocyanate) and said anhydride is maleic anhydride, and said base is N,N-dimethyl ethanolamine.

45. A water soluble polycaprolactone urethane adduct as claimed in claim 24, wherein in said adduct reaction product said polycaprolactone polyol is a polycaprolactone triol having an average molecular weight of 540 and an average hydroxyl number of 310, said polyisocyanate is poly(diphenylmethane diisocyanate) and said anhydride is phthalic anhydride, and said base is N,N-dimethyl ethanolamine.

46. A water soluble polycaprolactone urethane adduct as claimed in claim 24, wherein in said adduct reaction product said polycaprolactone polyol is a polycaprolactone triol having an average molecular weight of about 300 and an average hydroxyl number of 560, and said base is N,N-dimethyl ethanolamine.

47. A water soluble polycaprolactone urethane adduct as claimed in claim 24, wherein in said adduct reaction product said polycaprolactone polyol is a polycaprolactone triol having an average molecular weight of about 300 and an average hydroxyl number of about 560, said polyisocyanate is hydrogenated tolylene diisocyanate and said anhydride is phthalic anhydride, and said base is N,N-dimmethyl ethanolamine.

48. A coating composition comprising a water soluble polycaprolactone urethane adduct as claimed in claim 24 and additionally containing from 25 to 200 weight percent of a crosslinking agent based on the weight of said water soluble adduct present.

49. A coating composition comprising a water soluble polycaprolactone urethane adduct as claimed in claim 25 and additionally containing from 25 to 200 weight percent of a crosslinking agent based on the weight of said water soluble adduct present.

50. A coating composition comprising a water soluble polycaprolactone urethane adduct as claimed in claim 26 and additionally containing from 25 to 200 weight percent of a crosslinking agent based on the weight of said water soluble adduct present.

51. A coating composition comprising a water soluble polycaprolactone urethane adduct as claimed in claim 27 and additionally containing from 25 to 200 weight percent of a crosslinking agent based on the weight of said water soluble adduct present.

52. A coating composition comprising a water soluble polycaprolactone urethane adduct as claimed in claim 28 and additionally containing from 25 to 200 weight percent of a crosslinking agent based on the weight of said water soluble adduct present.

53. A coating composition comprising a water soluble polycaprolactone urethane adduct as claimed in claim 29 and additionally containing from 25 to 200 weight percent of a crosslinking agent based on the weight of said water soluble adduct present.

54. A coating composition comprising a water soluble polycaprolactone urethane adduct as claimed in claim 30 and additionally containing from 25 to 200 weight percent of a crosslinking agent based on the weight of said water soluble adduct present.

55. A coating composition comprising a water soluble polycaprolactone urethane adduct as claimed in claim 31 and additionally containing from 25 to 200 weight percent of a crosslinking agent based on the weight of said water soluble adduct present.

56. A coating composition comprising a wateer soluble polycaprolactone urethane adduct as claimed in claim 32 and additionally containing from 25 to 200 weight percent of a crosslinking agent based on the weight of said water soluble adduct present.

57. A coating composition comprising a water soluble polycaprolactone urethane adduct as claimed in claim 33 and additionally containing from 25 to 200 weight percent of a crosslinking agent based on the weight of said water soluble adduct present.

58. A coating composition comprising a water soluble polycaprolactone urethane adduct as claimed in claim 34 and additionally containing from 25 to 200 weight percent of a crosslinking agent based on the weight of said water soluble adduct present.

59. A coating composition comprising a water soluble polycaprolactone urethane adduct as claimed in claim 35 and additionally containing from 25 to 200 weight percent of a crosslinking agent based on the weight of said water soluble adduct present.

60. A coating composition comprising a water soluble polycaprolactone urethane adduct as claimed in claim 36 and additionally containing from 25 to 200 weight percent of a crosslinking agent based on the weight of said water soluble adduct present.

61. A coating composition comprising a water soluble polycaprolactone urethane adduct as claimed in claim 37 and additionally containing from 25 to 200 weight percent of a crosslinking agent based on the weight of said water soluble adduct present.

62. A coating composition comprising a water soluble polycaprolactone urethane adduct as claimed in claim 38 and additionally containing from 25 to 200 weight percent of a crosslinking agent based on the weight of said water soluble adduct present.

63. A coating composition comprising a water soluble polycaprolactone urethane adduct as claimed in claim 39 and additionally containing from 25 to 200 weight percent of a crosslinking agent based on the weight of said water soluble adduct present.

64. A coating composition comprising a water soluble polycaprolactone urethane adduct as claimed in claim 40 and additionally containing from 25 to 200 weight percent of a crosslinking agent based on the weight of said water soluble adduct present.

65. A coating composition comprising a water soluble polycaprolactone urethane adduct as claimed in claim 41 and additionally containing from 25 to 200 weight percent of a crosslinking agent based on the weight of said water soluble adduct present.

66. A coating composition comprising a water soluble polycaprolactone urethane adduct as claimed in claim 42 and additionally containing from 25 to 200 weight percent of a crosslinking agent based on the weight of said water soluble adduct present.

67. A coating composition comprising a water soluble polycaprolactone urethane adduct as claimed in claim 43 and additionally containing from 25 to 200 weight percent of a crosslinking agent based on the weight of said water soluble adduct present.

68. A coating composition comprising a water soluble polycaprolactone urethane adduct as claimed in claim 44 and additionally containing from 25 to 200 weight percent of a crosslinking agent based on the weight of said water soluble adduct present.

69. A coating composition comprising a water soluble polycaprolactone urethane adduct as claimed in claim 45 and additionally containing from 25 to 200 weight percent of a crosslinking agent based on the weight of said water soluble adduct present.

70. A coating composition comprising a water soluble polycaprolactone urethane adduct as claimed in claim 46 and additionally containing from 25 to 200 weight percent of a crosslinking agent based on the weight of said water soluble adduct present.

71. A coating composition comprising a water soluble polycaprolactone urethane adduct as claimed in claim 47 and additionally containing from 25 to 200 weight percent of a crosslinking agent based on the weight of said water soluble adduct present.

* * * * *